Dec. 22, 1959     A. M. LIPPISCH     2,918,230
FLUID SUSTAINED AND FLUID PROPELLED AIRCRAFT
Filed Aug. 24, 1956     3 Sheets-Sheet 1
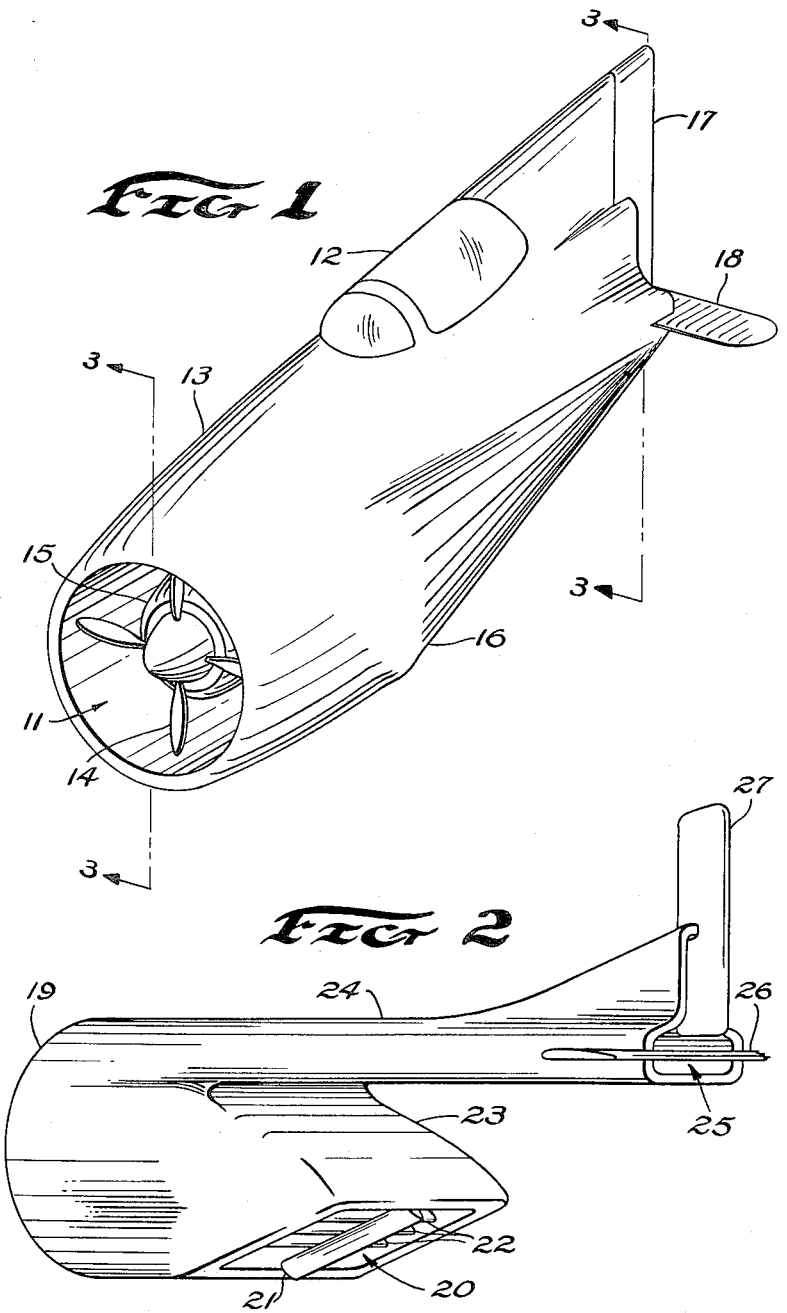
INVENTOR.
ALEXANDER M. LIPPISCH
BY
ATTORNEY Dec. 22, 1959 A. M. LIPPISCH 2,918,230
FLUID SUSTAINED AND FLUID PROPELLED AIRCRAFT
Filed Aug. 24, 1956 3 Sheets-Sheet 2
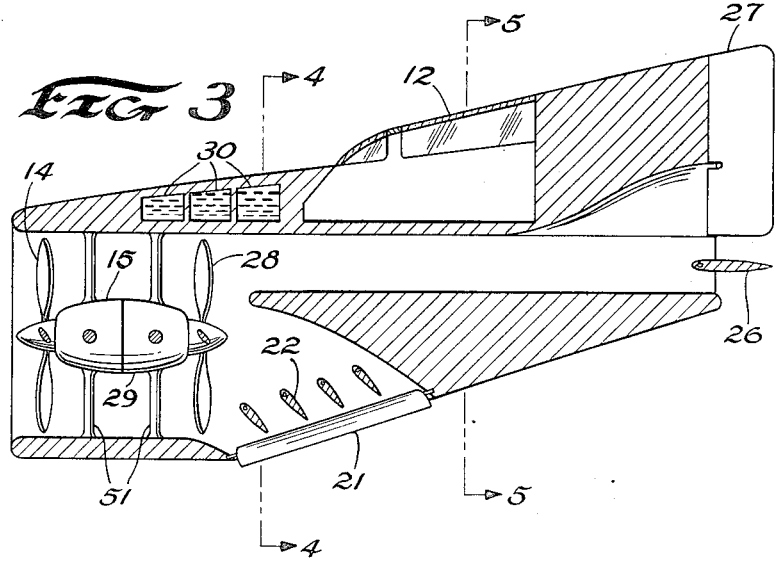
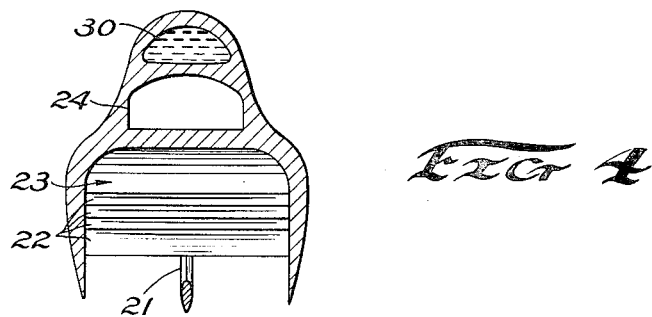
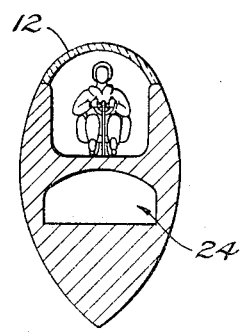
INVENTOR.
ALEXANDER M. LIPPISCH
BY
*Marvin Moody*
ATTORNEY Dec. 22, 1959      A. M. LIPPISCH      2,918,230
FLUID SUSTAINED AND FLUID PROPELLED AIRCRAFT
Filed Aug. 24, 1956      3 Sheets-Sheet 3
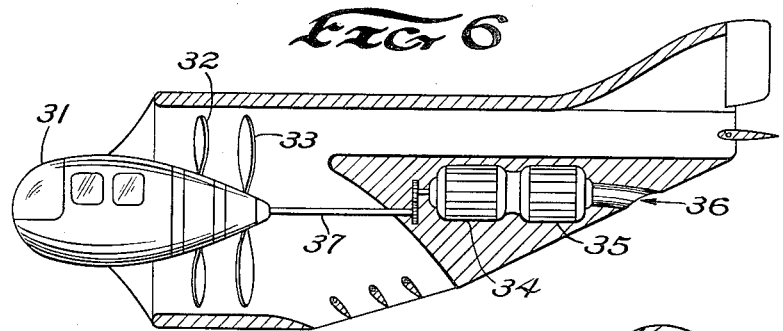
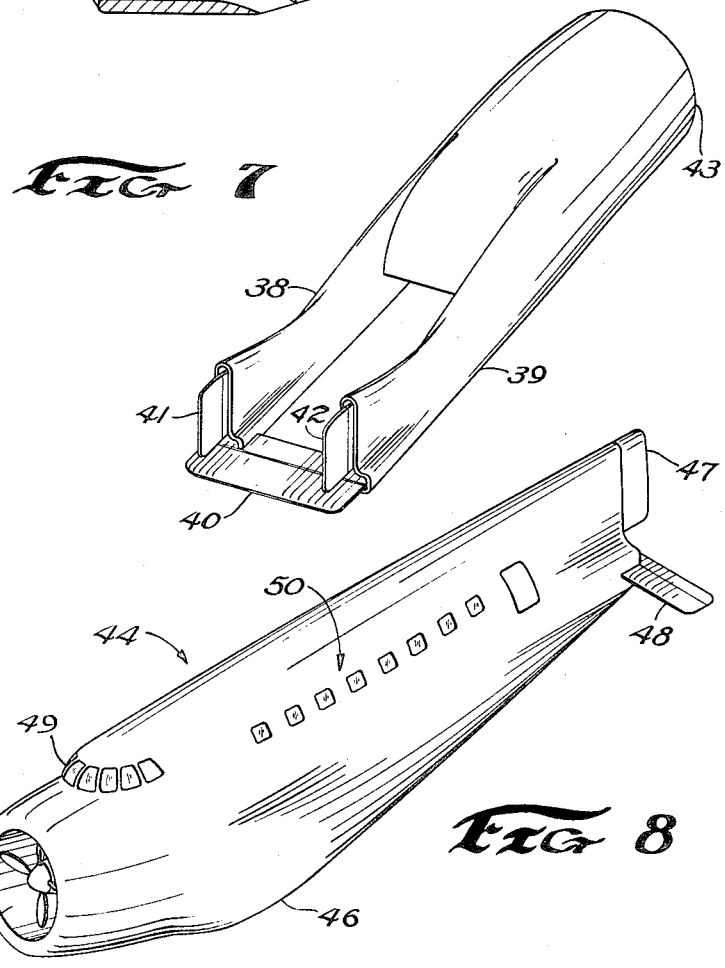
INVENTOR.
ALEXANDER M. LIPPISCH
BY
*Marvin Moody*
ATTORNEY United States Patent Office
2,918,230
Patented Dec. 22, 1959

2,918,230

FLUID SUSTAINED AND FLUID PROPELLED AIRCRAFT

Alexander M. Lippisch, Cedar Rapids, Iowa, assignor to Collins Radio Company, Cedar Rapids, Iowa, a corporation of Iowa Application August 24, 1956, Serial No. 606,059

2 Claims. (Cl. 244—23)

The present invention pertains to wingless aircraft and particularly to aircraft with propellers enclosed within an air duct. The air duct and associate vanes direct an airstream as required for hovering, for vertical flight, or for forward flight.

Helicopters for air cargo and passenger service have been utilized in metropolitan areas. Helicopters are complicated by the gearing required at the hub of the propeller blades for changing pitch during their rotation. The speed of the helicopter is limited because when the forward velocity of the craft approaches the rotational velocity of the blade, the lift provided by the horizontal blade is reduced on one side of the aircraft. The size of the blade required on the helicopter is in itself a problem when helicopters are to be parked in a limited space; for example, on a roof heliport.

An object of the present invention is to provide simplified aircraft capable of vertical flight, hovering or horizontal flight.

Another object is to provide aircraft with shrouded propellers for obtaining increased efficiency.

Another object is to provide a single air propelling system in a bifurcated duct that directs two airstreams, one of the airstreams being directed downwardly and rearwardly to provide lift and propulsion at the center of gravity of the aircraft, and the other airstream being directed from the rear of the craft for readily changing attitude.

Another object is to provide in the aircraft air deflecting vanes at the outlets of the duct for providing control of the attitude of the aircraft through the use of conventional control means.

And still another object is to provide an arrangement in an aircraft in which the cockpit is ahead of the propellers so that wide angle visibility and a reduction of sound is obtained.

The objects and appended claims may be more readily understood by studying the following description with reference to the figures in which:

Figure 1 is a front oblique view of a small aircraft that utilizes the airflow system of this invention;

Figure 2 shows a rear oblique view of the air duct and its associated control services of this invention;

Figure 3 is a cross-sectional side view of the aircraft shown in Figure 1;

Figure 4 is a transverse cross-sectional view taken on plane 4—4 of Figure 3;

Figure 5 is a transverse cross-sectional view taken on plane 5—5 of Figure 3;

Figure 6 shows a side cross-sectional view of an aircraft that is partly cut away for showing modifications of the invention;

Figure 7 shows an oblique rear view of an air duct having a plurality of rear control portions; and Figure 8 is a front oblique drawing of a passenger aircraft that uses the airflow system of this invention.

In general, each of the various aircraft of this invention utilizes an air duct for obtaining increased efficiency and for obtaining effective control of the aircraft. The front portion of the air duct may be cylindrical with an opening facing frontwardly. An air propelling system located within the cylindrical duct generates the required air stream for lifting, for forward thrust, and for control. The air duct is divided into a downwardly and rearwardly projecting portion near the center of gravity for providing lifting force and forward thrust, and one or more portions that extend to the rear of the aircraft for directing an air stream over the elevator and rudder. Deflection of the stream by the controllable elevator and rudder change the attitude of the aircraft as required. Although the aircraft in the accompanying drawings has been shown without landing gears, it is to be understood that conventional landing gears are used with the aircraft described herein.

A small aircraft that utilizes a bifurcated air duct is illustrated in Figure 1. The aircraft includes air duct 11, required power equipment, fuel tanks, and cockpit 12 all enclosed by outer skin 13. The forward portion of the air duct is a cylinder that is substantially horizontal or inclined slightly upward towards the front. A front opening of the duct faces frontwardly and preferably slightly upwardly. Propeller 14, propeller housing 15, and propeller driving means are mounted within the horizontal cylinder. As the air duct extends rearwardly, it is divided into two portions. The larger portion of the air duct is directed downwardly and rearwardly for forcing air out of an opening at the bottom of mid-section 16 of the aircraft. The smaller portion or the control portion of the air duct is directed rearwardly for discharging air on to rudder 17 and elevator 18.

In Figure 2 is shown the air duct and the control vanes of the aircraft that is illustrated in Figure 1. The air duct includes the forward cylindrical portion 19 that has its axis substantially parallel with the longitudinal axis of the aircraft. This cylindrical portion divides near the center of the aircraft to form a downwardly and rearwardly directed mid-section 23 that may have a rectangular opening, and a smaller horizontal portion 24 that extends to the rear and that has a rear opening 25 for directing an airstream over elevator 26 and rudder 27. The direction of flow of the airstream from the bottom opening 20 is controlled over wide angles by roll flap 21 and deflecting vanes 22. These vanes are controlled by usual control means employed in aircraft. For vertical or hovering flight the horizontal vanes are set for deflecting the airstream downwardly and for horizontal flight the vanes are set for directing the airstream at a slanted direction rearwardly and downwardly. Roll flap 21 may be controlled for deflecting the airstream sideways for controlling the roll of the aircraft. Control of the aircraft through use of the centrally located bottom opening alone would be difficult. In order to increase the torque about the center of gravity for readily changing the attitude of the aircraft, the rear portion 24 of the air duct is included for directing a stream of air over the rudder and elevator.

Operation of these rear control surfaces in the usual manner is very effective in changing attitude of the aircraft because of the high velocity of the airflow over the surfaces.

The air duct is clearly shown in the cross-sectional view of the aircraft shown in Figure 3. Counter-rotating propellers 14 and 28 are mounted within the front horizontal portion of the duct. Engines 15 and 29 for driving the propellers are mounted to the main frame of the aircraft by radial supporting bars 51. Gasoline tanks 30 are shown in a forward position above the air duct and cockpit 12 is shown behind the gasoline tanks and above the air duct.

In Figure 4 is shown a cross-sectional view of Figure 3 on plane 4—4. This view shows the placement of gasoline tank 30 above the rear portion 24 of the duct and shows the larger portion 23 of the air duct.

In Figure 5 is shown a cross-sectional view taken of plane 5—5 of Figure 3. In this view the cockpit 12 is shown above rear portion 24 of the air duct.

A modification of the invention is illustrated in the partial cutaway side view shown in Figure 6. This modification includes the bifurcated air duct which provides effective control of the aircraft as described for the aircraft illustrated in Figure 1. In this modification, cockpit 31 has been located ahead of counter-rotating propellers 32 and 33, and turboprop engines 34 and 35 have been located near the rear of the aircraft. By locating the engines near the rear of the aircraft, exhaust gases are conducted through a short duct 36 to the rear of the aircraft. Power from engines 34 and 35 is transmitted through shaft 37 to propellers 32 and 33.

In addition to obtaining the efficiency and control features associated with a bifurcated air duct, the modification shown in Figure 6 provides cabin space ahead of the propellers in order that insulation from noise is very effective. Location of the engines in the rear of the aircraft permit gases to be exhausted readily and provides additional thrust that may be derived from the exhaust.

The air duct illustrated in Figure 7 utilizes two rearwardly extending portions for directing airstreams over the rear control surfaces. A duct having this configuration may be readily used in aircraft similar to those illustrated in Figures 1 and 6. In this example, air from rear ducts 38 and 39 is directed over elevator 40. If desired, the outlets of the rear ducts may have the inverted T shape as shown in Figure 2 so that rudders 41 and 42 are in the airstream supplied from the ducts. As described in Figure 2, the cylindrical portion 43 has a front opening and joins with a downwardly and rearwardly mid-section.

An elongated streamlined passenger aircraft utilizing a bifurcated air duct is illustrated in Figure 8. Aircraft 44 has an air duct with a front opening 45, downwardly and rearwardly facing opening at mid-section 46, and an inverted T shaped opening for exhausting air over rudder 47 and elevator 48. The rear portion of the air duct is inclined slightly upward for obtaining better pitch stability. Cockpit 49 and passenger cabin 50 are located near the top of the aircraft.

During take-off of the aircraft of this invention, the deflecting vanes located in the larger exhaust opening are positioned by conventional control means for deflecting an airstream downwardly. Also, the elevator and the roll flap are positioned as required for stabilizing the aircraft. The downwardly directed air stream causes the craft to rise vertically until desired altitude is attained before starting horizontal flight. Then conventional controls are operated for positioning the deflecting vanes in the larger air duct for directing the air stream rearwardly and downwardly. The downwardly vector provides lift as required for supporting the plane and the rearwardly vector provides thrust for propelling the aircraft forward.

In forward flight, the deflecting vanes correspond to trim tabs of the conventional wing-type aircraft. The deflecting vanes are set to provide required lift under average flight conditions so that horizontal flight is maintained readily. Small correction for determining the altitude of the plane is supplied by the roll flap at the exhaust opening of the larger air duct and by the rudder and elevator at the inverted T opening of the rear air duct. The flow of air from the rear air duct over the rudder and elevator cause these control surfaces to be particularly effective in changing the attitude of the aircraft in response to the operation of conventional control systems.

Through the use of shrouded propellers, the aircraft of this invention provides greater lift and thrust per horsepower than is provided by aircraft using unshrouded propellers. The air duct in the arcraft of this invention provides two separate airstreams. The larger airstream emitted near the center of gravity of the aircraft provides most of the lift and propulsion; the smaller airstream emitted in the rear of the aircraft provides effective control and also aids in propulsion. The rear control air duct need not be parallel with the longitudinal axis of the arcraft. Good pitch stability may be provided by inclining the rear duct or control duct slightly upward toward the rear of the aircraft.

Flight speed of the aircraft of this invention is improved not only by increasing the efficiency of the propellers but also by reducing drag caused by large wing surfaces. Previous aircraft capable of landing at low speeds have had large wings or large horizontal propeller blades. In the present aircraft, the frontal profile has been greatly reduced by the absence of wings. The reduction of drag and increased thrust provided by shrouded propellers ensures a high rate of forward flight.

Although this invention has been described with respect to particular embodiments thereof, it is not to be so limited as changes and modifications may be made therein which are within the full intended scope of the invention as defined by the appended claims.

What is claimed is:

1. A wingless aircraft having an elongated fuselage that has a nose and an aft end, said fuselage encompassing an air duct, said air duct having a main portion extending rearwardly from a frontal inlet in said nose and dividing into a first branch that extends laterally to a side outlet and a second branch that extends longitudinally through the fuselage to an aft outlet, substantially all of the lateral cross-sectional area of said nose being the inlet of said main portion, said first branch being substantially larger than said second branch, air-propelling means mounted within said main portion, and controllable air-deflecting vanes mounted within said outlets.

2. A wingless aircraft comprising an elongated streamlined fuselage, the walls of said fuselage defining an air duct, said air duct having an inlet, a side outlet, and a plurality of aft outlets, said inlet facing forward at the front of said fuselage and being predominate in the frontal profile of said aircraft, said air duct having a main portion extending rearwardly from said inlet and dividing into a plurality of branches, one of said branches having substantial cross-sectional area and gradually curving laterally to terminate in said side outlet, the other of said branches having less combined cross-sectional area than said one branch and extending longitudinally through said fuselage to terminate in respective ones of said aft outlets, air-propelling means mounted within said main portion, and controllable air-deflecting vanes mounted in said outlets.

References Cited in the file of this patent

UNITED STATES PATENTS 2,444,318  Warner _____ June 29, 1948

FOREIGN PATENTS 427,017  Great Britain _____ Jan. 9, 1934
865,393  France _____ Feb. 24, 1941